(12) United States Patent
Safford et al.

(10) Patent No.: US 7,409,524 B2
(45) Date of Patent: Aug. 5, 2008

(54) SYSTEM AND METHOD FOR RESPONDING TO TLB MISSES

(75) Inventors: Kevin Safford, Fort Collins, CO (US); Rohit Bhatia, Fort Collins, CO (US); Karl Brummel, Chicago, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 242 days.

(21) Appl. No.: 11/205,622

(22) Filed: Aug. 17, 2005

(65) Prior Publication Data

US 2007/0043929 A1 Feb. 22, 2007

(51) Int. Cl.
*G06F 12/00* (2006.01)

(52) U.S. Cl. ............... 711/205; 711/122; 711/203; 711/207

(58) Field of Classification Search ............ 711/205, 711/122, 203, 207
See application file for complete search history.

(56) References Cited

U.S. PATENT DOCUMENTS

| | | | |
|---|---|---|---|
| 5,008,813 A | | 4/1991 | Crane et al. |
| 5,809,563 A | * | 9/1998 | Yamada et al. ............ 711/207 |
| 5,860,146 A | | 1/1999 | Vishin et al. |
| 5,870,599 A | * | 2/1999 | Hinton et al. ............ 712/239 |
| 6,427,188 B1 | * | 7/2002 | Lyon et al. ............ 711/122 |
| 7,111,145 B1 | * | 9/2006 | Chen et al. ............ 711/206 |
| 2004/0015752 A1 | | 1/2004 | Patella et al. |

OTHER PUBLICATIONS

Jacob, Bruce, Virtual Memory Systems and TLB Structures, pp. 1-17, 2001 CRC Press.
Intel Itanium Architecture Software Developer's Manual, vol. 2: System Architecture, Revision 2.1, Oct. 2002.
Next Generation Itanium Processor Overview, Intel Developer Forum, Fall 2001.
Computer Organization and Design The Hardware/Software Interface, Second Edition, Chapter 7, pp. 540-635, 1998.

* cited by examiner

*Primary Examiner*—Stephen C Elmore

(57) ABSTRACT

The present invention relates to an improved microprocessor having a memory system with several caches that can be operated to provide virtual memory. Among the caches included in the microprocessor are conventional caches that store data and instructions to be utilized by the processes being performed by the microprocessor, and that are typically arranged in a cache hierarchy, as well as one or more translation lookaside buffer (TLB) caches that store a limited number of virtual page translations. The improved microprocessor also has an additional cache that serves to store a virtual hash page table (VHPT) that is accessed when TLB misses occur. The introduction of this VHPT cache eliminates or at least reduces the need for the microprocessor to look for information within the caches of the cache hierarchy or in other memory (e.g., main memory) outside of the microprocessor when TLB misses occur, and consequently enhances microprocessor speed.

20 Claims, 2 Drawing Sheets

SYSTEM AND METHOD FOR RESPONDING TO TLB MISSES

CROSS-REFERENCE TO RELATED APPLICATIONS

STATEMENT REGARDING FEDERALLY SPONSORED RESEARCH OR DEVELOPMENT

FIELD OF THE INVENTION

The present invention relates to microprocessors, and more particularly to microprocessors that employ a translation lookaside buffer (TLB) and a virtual hash page table (VHPT) in implementing a virtual memory system.

BACKGROUND OF THE INVENTION

Microprocessors typically employ one or more caches to store data and instructions for use by the processes being executed. Often, these caches take the form of a cache hierarchy including two or three caches that are physically positioned successively farther away from the processor. The use of such caches makes it possible for the processor to access information more rapidly than would otherwise be the case if the processor had to obtain the information from main memory or some other memory device.

Although the information stored in caches can be accessed significantly faster than the information stored in other memory devices such as main memory, caches are only able to store relatively small amounts of information. That is, only a relatively small portion of all of the information required by a process being executed by a processor typically resides in the cache(s). Nevertheless, even though a cache at any given time may only store a fraction of the total amount of information that may be required by a given process, the operation of the cache can be managed in such a way that at any given time the cache holds much if not all of the information that is required by the process at that particular time. Information desired by a process that is absent from a cache can usually be transferred to the cache from another memory device.

Because information is stored in multiple memory devices including cache(s), main memory, and elsewhere, and because as discussed above such information is often moved among the different memory devices (e.g., to and from the caches), it would be difficult to compose processes for execution on a processor if those processes were themselves responsible for controlling the movement and storage of information and keeping track of the locations of the information to allow for accessing of that information. Instead of burdening the processes with such responsibilities, many modern microprocessors implement "virtual memory" systems in which the microprocessors organize and manage the operations of the various memory devices in such a manner that, from the perspective of the processes, the overall memory appears to take on a standardized form independent of the particular memory devices that are available.

To implement such a virtual memory system, actual physical memory locations or addresses are mapped to corresponding virtual addresses, typically in a one-to-one manner. Rather than having to access the actual memory addresses, processes operating on the processor merely refer to the virtual addresses. By virtue of a page table or similar map that stores the correspondences between the physical and virtual addresses, the referred to virtual addresses are converted into the actual physical addresses and as a result the data at those actual memory addresses can then be provided to the processes requesting that data.

Due to its size, the page table itself is stored in main memory. However, for much the same reasons that the substantive information desired by processes operating on the processor are stored in cache(s) (in particular, to facilitate the speed of accessing the stored information), portions of the page table that are most relevant to the processes being performed at a given time can also be stored in a specialized cache termed a translation lookaside buffer ("TLB"). When a process requests information at a given virtual address, the processor first consults the TLB cache rather than the page table in main memory to obtain the mapping or translation of that virtual address into a corresponding physical address. If the TLB cache does not include the desired translation, such that a "TLB miss" occurs, then the desired translation is obtained from the page table and inserted into the TLB.

Although the use of a TLB cache improves the speed with which a desired translation can be obtained, the TLB cache by itself fails to address another problem associated with the accessing of such translations. Because the amount of data in a page table is typically very large, the process of searching through a page table for a desired translation can itself take a relatively large amount of time. To reduce the time associated with such searching, rather than consulting standard page tables, many conventional processors instead consult a modified version of page table termed a virtual hash page table ("VHPT") in main memory that assigns codes or hashes to the different translation information. The codes are typically representative of the different translations but are shorter in length, and consequently it is possible to search through the translations as represented in the VHPT, by a hardware or software-implemented "page walker", at a quicker pace than would be possible if a standard page table was being searched.

While the use of a TLB cache in conjunction with a VHPT in main memory improves the rapidity with which a processor can obtain desired address translation information, it would be desirable to achieve even faster rates of obtaining desired translations than are achieved with current systems. In particular, it would be desirable to improve the speed with which a processor is able to obtain desired translation information from the VHPT when TLB misses occur. Although inclusion of VHPT information within one or more of the caches of the cache hierarchy of the microprocessor might initially appear to provide some benefit, insofar as the caches can be accessed more quickly than main memory, this does not in fact provide any significant benefit.

More particularly, the caches of the cache hierarchy are operated in a manner that takes advantage of a "temporal locality" principle. That is, the caches are operated so as to favor the continued storing of information that has been more recently accessed by the processor and to overwrite/replace information that has been less recently accessed, with the underlying presumption being that the more recently a given piece of data has been requested, the more likely it is to be requested again in the future. Although caching information based upon the temporal locality principle works well generally in terms of making available to the processor that information which is most likely to be of use to the processor at a given time, the caching of VHPT entries within the caches of the cache hierarchy based upon this principle does not work well. TLB misses, and consequently searches for VHPT entries, occur with such a low frequency relative to the frequency with which other types of information (e.g., substantive information) are requested that relevant VHPT entries stored in the cache hierarchy are usually replaced/overwritten before those entries are requested again.

Therefore, it would be advantageous if a new system and method could be developed that enhanced the speed at which stored data could be accessed by a processor. More particularly, it would be advantageous if such a new system and method increased the speed at which appropriate VHPT entries representing correspondences between virtual and physical addresses could be obtained by the processor in response to TLB misses, such that the data stored at the physical addresses corresponding to those virtual addresses could be more rapidly accessed by the processor.

BRIEF SUMMARY OF THE INVENTION

The present invention in at least some embodiments relates to a microprocessor system capable of supporting a virtual memory. The microprocessor system includes a first cache configured to store at least one of data and instructions for use by a process, and a second cache serving as a translation lookaside buffer (TLB) that stores virtual address translations referenced by the process. The microprocessor system further includes a third cache storing a virtual hash page table (VHPT) that is configured to be accessed upon an occurrence of a TLB miss, and a processor on which the process is performed, where the processor is at least indirectly in communication with each of the caches.

DETAILED DESCRIPTION OF THE PREFERRED EMBODIMENT

Figure 1:
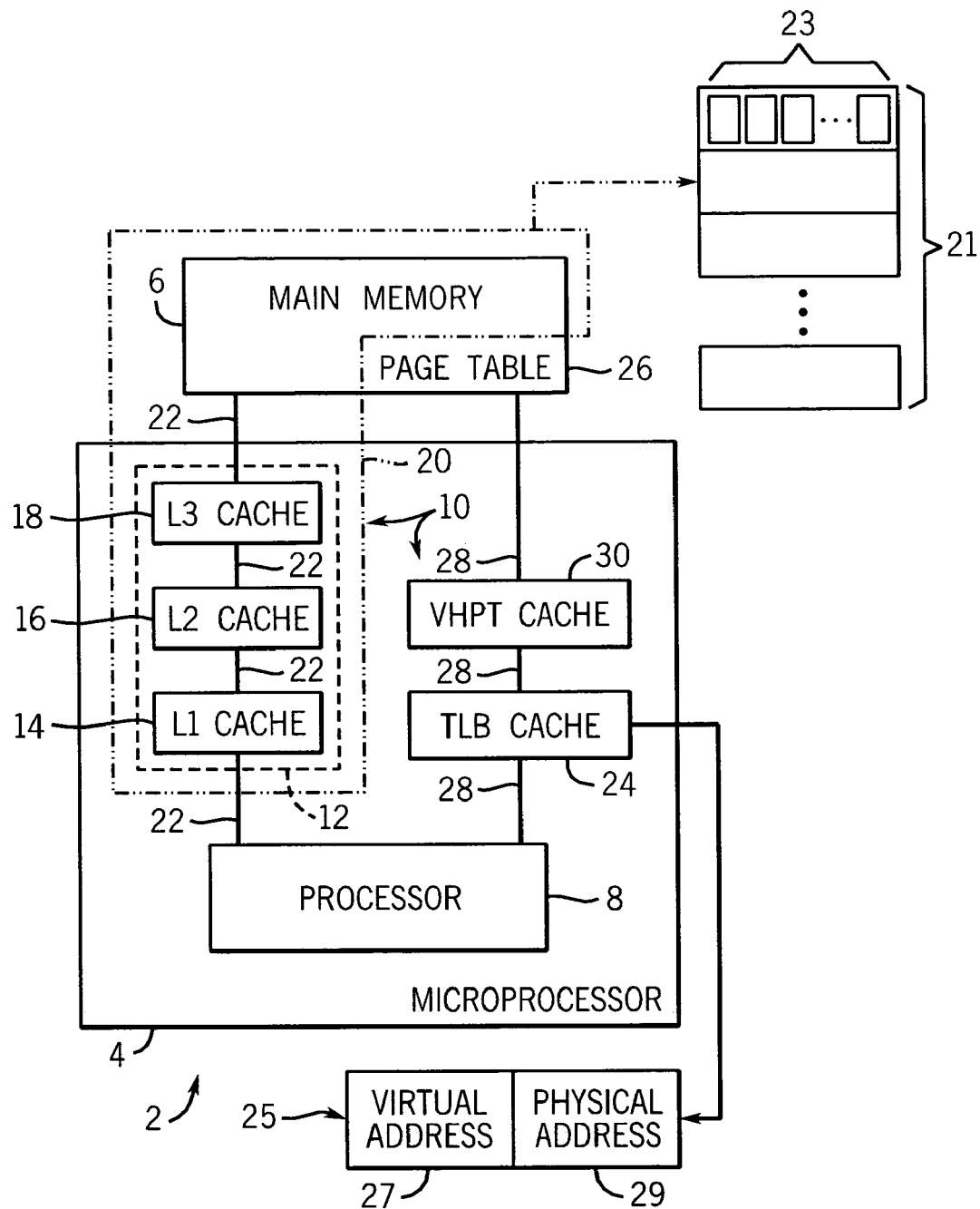
FIG. 1 shows in schematic form components of a microprocessor system in accordance with one embodiment of the present invention.

Referring to FIG. 1, components of an exemplary microprocessor system 2 are shown in a simplified, schematic form. As shown, the microprocessor system 2 includes a microprocessor 4 that is in communication with a main memory 6. The microprocessor 4 is intended to be representative of any of a variety of different types of microprocessors as adapted in accordance with various embodiments of the present invention. For example, in certain embodiments, the microprocessor 4 could be an Itanium®, Pentium®, Intel® 486 or other microprocessor available from Intel Corporation of Santa Clara, Calif., adapted in accordance with various embodiments of the present invention.

The main memory 6, which is located externally of the microprocessor 4, is intended to be representative of any of a variety of different types of memory devices and combinations of such devices. The main memory 6 can include, for example, one or more conventional random access memory (RAM) devices such as dynamic random access memory (DRAM) devices. Additionally, although the term "main memory" is often used to refer to chip-based memory, for purposes of generality the main memory 6 as used herein is intended to be representative of other types of memory devices as well, such as memory provided on floppy or hard disks, tapes or other storage devices that can be coupled to the microprocessor 4 either directly or indirectly.

Further as shown in FIG. 1, the microprocessor 4 includes both a processor 8 and various other internal memory devices 10. More particularly, the internal memory devices 10 include a cache hierarchy 12 that has, in the present embodiment, first, second and third caches 14, 16 and 18, respectively. Each successive cache 14, 16 and 18 in the cache hierarchy 12 is progressively slower but contains a greater amount of memory relative to the previous cache(s) in the cache hierarchy. Although the cache hierarchy 12 shown in FIG. 1 has three different levels of caches, the number of caches in other embodiments could vary from that shown, for example, to include only one or two different caches or possibly more than three caches (or even possibly no caches). The caches 14-18 and main memory 6 each store data and other information (e.g., instructions) that is or may be of interest to the process(es) being performed by the processor 8.

The processor 8 is coupled to each of the caches 14, 16 and 18 and further to the main memory 6 by one or more communication links 22. In the embodiment shown, the caches 14-18 and main memory 6 are connected, one after another, in a sequential manner, and likewise are in communication with one another in a sequential manner. That is, the processor 8 is directly in communication with the first cache 14, the first cache is in direct communication with the second cache 16, the second cache is in direct communication with the third cache 18, and the third cache 18 is in direct communication with the main memory 6.

When the processor 8 is searching for information to satisfy one of its processes, the processor first turns to the first cache 14. If the first cache 14 lacks the desired information, then it searches for the information in the second cache 16 and, if found, that information is then inserted into the first cache 14. Analogously, if the second cache lacks the desired information, then the third cache 18 is consulted, and if the third cache also lacks the desired information, then the main memory 6 is searched (with the information that is found then being used to update the caches that were searched and are missing that information). Notwithstanding the above description, in alternate embodiments (particularly embodiments in which different types or combinations of caches or other memory devices are employed) this searching process can proceed in other manners.

The memory provided by the cache hierarchy 12 in combination with the memory represented by the main memory 6 (including possibly any external storage devices) together form a virtual memory 20. The virtual memory 20 effectively reorganizes the physical memory locations or addresses found in the caches 14-18 and the main memory 6 into virtual regions 21 and virtual pages 23 within those virtual regions. Every (or nearly every) physical address has a corresponding virtual address identifying a particular virtual page within a particular virtual region. Although in the present embodiment the virtual memory 20 is divided into virtual regions 21 and virtual pages 23, in alternate embodiments the virtual memory could be organized along other lines as well.

Through the use of the virtual memory 20, when processes operating on the processor 8 require data or other information stored within one or more of the caches 14-18 or the main memory 6, the processes need not reference the physical addresses at which the desired information is located, but rather can simply refer to the virtual addresses of that information. Thus, the processes operating on the processor 8 need not have any information regarding the actual physical structure of the memory devices comprised within the virtual memory 20, and each process can refer to virtual addresses without any knowledge concerning the actual physical addresses that might correspond to those virtual addresses, or any concern for how to control the interactions among the different memory devices.

When more than one process is operating on the processor 8, typically each process being performed is assigned a virtual page (or potentially a virtual region or other clearly-delineated portion of the virtual memory 20) that it does not share with any other process operating on the processor. That is, each process operating on the processor 8 is allocated its own portion of memory that is independent and unaffected by any other portions of memory that are allocated to other processes. This allocation of distinct portions of the virtual memory 20 to the different processes operating on the processor 8 reduces the chance that inconsistencies or errors will develop within the stored data due to unintended overwriting of the stored data.

In order to allow the processes operating on the processor 8 to make use of the virtual memory 20 in the above-described manner, the processor requires additional mapping information by which the processor can convert the virtual addresses referenced by the processes into corresponding physical addresses within the memory devices 14-18, 6. In the microprocessor 4 shown in FIG. 1, the processor 8 first searches for such mapping information within a translation lookaside buffer ("TLB") cache 24. The TLB cache 24 serves as a TLB that contains a limited number of correspondences or translations 25 between virtual addresses 27 and physical addresses 29.

Although many times the TLB cache 24 has the virtual address/physical address translations that are requested by the processor 8, occasionally the TLB cache lacks a particular translation and a "TLB miss" occurs. When this happens, the processor 8 resorts to searching for the desired translation information in a virtual hash page table (VHPT) that, like the TLB, also stores information relating to translations between virtual addresses and physical addresses. In contrast to the TLB, typically the VHPT stores the translation information as VHPT entries. As discussed above, the translation information contained in the VHPT entries is in a coded or hashed format that is more easily searched, in order to reduce the time necessary to search for a particular translation.

The information within the VHPT typically is a subset of a complete set of all of the translations (or almost all of the translations) that are possible between virtual addresses within the virtual memory 20 and corresponding physical addresses pertaining to particular memory locations within the physical memory devices 14-18, 6. The complete set of translations (or "page table") 26 is typically stored within the main memory 6 (albeit it possibly could also be stored in other places, such as in the cache hierarchy 12). As indicated by FIG. 1, the portion of the main memory 6 storing the page table 26 need not be included as part of the virtual memory 20. Both the VHPT and the page table 26 can be searched by way of a variety of techniques, for example, by way of a hardware or software page walker. As further shown in FIG. 1, the processor 8 communicates with the TLB cache 24, the VHPT and the page table 26 of the main memory 6 by way of one or more additional communication links 28.

As shown in FIG. 1, the VHPT is found in a dedicated VHPT cache 30 that is a distinct cache separate from the TLB cache 24, separate from the caches 14-18 of the cache hierarchy 12, and separate from the main memory 6. Consequently, the VHPT is not found within any of the caches of the cache hierarchy 12, and is not found within the main memory 6, and thus also is not found within any of the memory devices that make up the virtual memory 20. Because the VHPT cache 30 is a cache, the processor 8 is able to access the information within the VHPT at a faster rate than would be possible if the processor had to consult a VHPT stored within the main memory 6. Although not necessarily the case, the VHPT cache 30 preferably is sufficiently large so as to include all of the addresses that a given process might use.

Additionally, while systems having a VHPT stored within one or more of the caches 14-18 of the cache hierarchy 12 would lack the benefits of temporal locality (at least in relation to the accessing of VHPT entries), the present system shown in FIG. 1 provides the benefits of temporal locality in relation to the accessing of VHPT entries. The frequency with which requests to the TLB cache 24 cannot be met (e.g., the frequency of TLB misses) typically is much less than the frequency with which a given piece of data/information stored within one of the caches 14-18 required by one or more of the processes being performed by the processor 8 is missing from those caches. Consequently, if VHPT entries were stored within the caches 14-18 in the midst of other types of information, many if not all of those VHPT entries would likely be displaced prematurely by other information entered into those caches even though the displaced VHPT information was still likely to be of use in the future.

In contrast, because in the present embodiment the VHPT entries are stored within their own dedicated cache 30 rather than within one or more of the other caches 14-18 of the cache hierarchy 12, the VHPT entries are stored in a manner that avoids their commingling with other non-VHPT data and information (e.g., instructions). As a result, the VHPT entries stored within the VHPT cache 30 are stored in a manner that prevents or limits their excessively-rapid replacement by other non-VHPT information. The separation of the VHPT cache 30 from the cache hierarchy 12 also has the added effect of avoiding any pollution of the caches of the cache hierarchy with VHPT entries.

For the above-discussed reasons, therefore, the information that is of use during TLB misses is much more likely to be found within the VHPT cache 30 than would be the case if the VHPT entries were stored in the cache hierarchy 12. Nevertheless, on occasion, the particular VHPT entries that are desired in response to TLB misses are absent from the VHPT cache 30. In such cases when the VHPT cache 30 does not have the desired VHPT information, the VHPT information is then obtained from the page table 26. Upon being obtained, the VHPT information (or other page table information) is used to update the VHPT cache 30, typically by replacing one or more of the other VHPT entries within the cache that have not been accessed for a long time. Further, the information is additionally used to update the TLB cache 24 and to provide translation information to the processor 8.

Notwithstanding the fact that the VHPT described above is provided by way of a cache that is dedicated for such purpose, the VHPT otherwise in at least some embodiments can be configured and operated in the same or much the same manners as conventional VHPTs are configured and operated. For example, in certain embodiments, the VHPT could be configured and operated in largely the same manners as the VHPT described in the "Intel® Itanium® Architecture Software Developer's Manual", Revision 2.1, October 2002 concerning the Itanium® processor mentioned above, which is hereby incorporated by reference herein. More particularly, as set forth in Sections 4.1.5 to 4.1.7 of that manual, in such embodiments the VHPT would be a per-region virtual linear page table structure (8-byte short format) or a single large hash page table (32-byte long format). The VHPT walker would check only a particular VHPT entry addressed by short- or long-format hash functions as determined by a page table address register.

Figure 2:
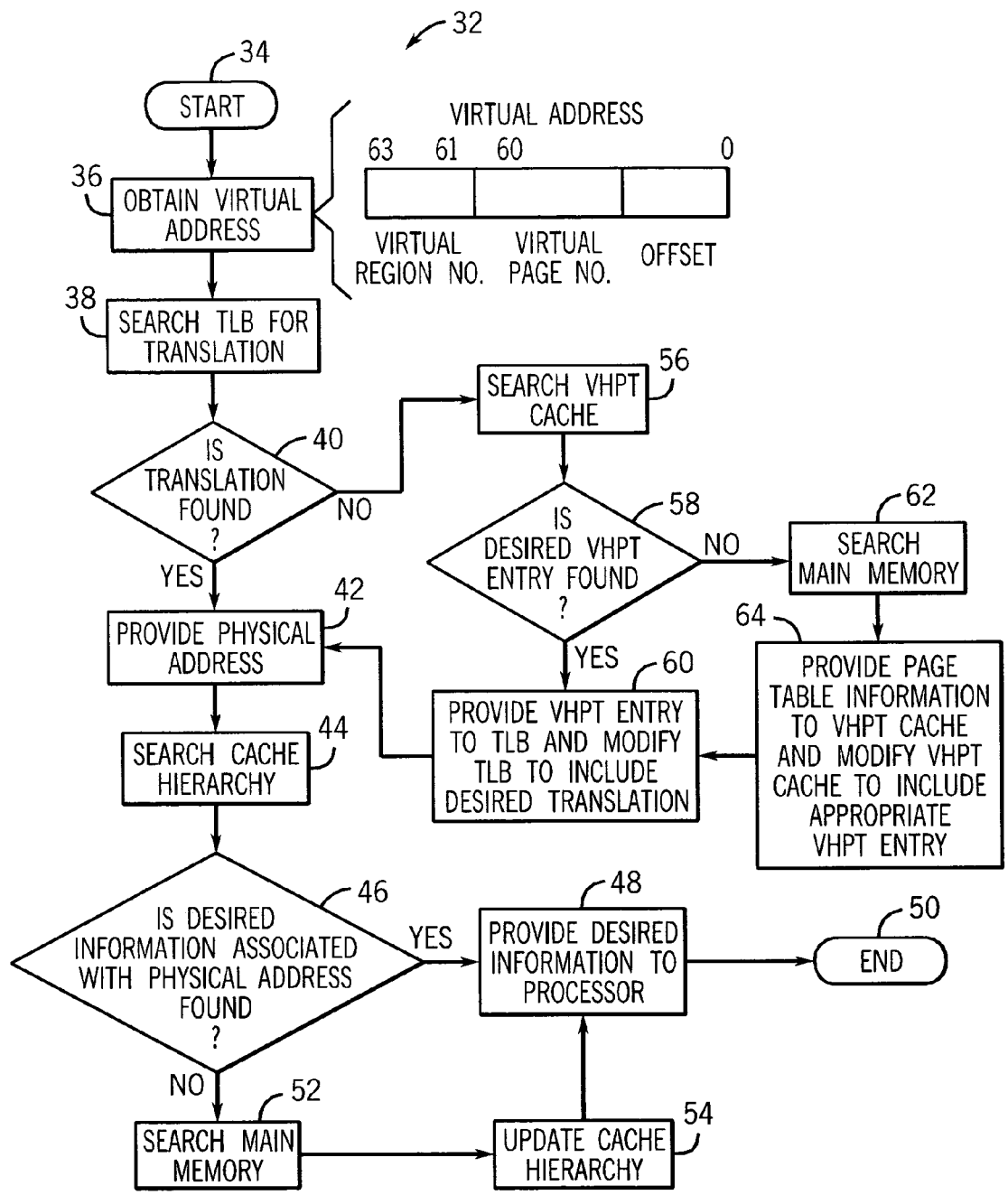
FIG. 2 is a flow chart showing exemplary steps of operation of the microprocessor system of FIG. 1, particularly in relation to interactions among a TLB cache and a VHPT cache of that system in accordance with one embodiment of the present invention.

Turning to FIG. 2, a flow chart 32 illustrates exemplary operations that are performed by the microprocessor system 2 in attempting to obtain information desired by one of its processes from the virtual memory 20 by way of the TLB cache 24, VHPT cache 30 and page table 26. As shown, upon starting at a step 34, the processor 8 is searching for a piece of information desired by one of its processes. At a step 36, the processor 8 obtains the virtual address of the desired information from the process. As shown, the virtual address could be a 64-bit address identifying a virtual region number, a virtual page number and an offset value indicating the location of the desired information within the virtual memory 20. Next, at a step 38, the processor 8 searches the TLB cache 24 for a translation of the virtual address.

If the translation is found in the TLB cache 24 at a step 40, then the processor 8 is provided with the physical address corresponding to the specified virtual address, at a step 42. Once the physical address is provided at step 42, the processor 8 then searches the cache hierarchy 12 at a step 44. If the desired information associated with the physical address is found in the cache hierarchy at a step 46, then the desired information is provided to the appropriate process operating on the processor 8 at a step 48 and then the process of obtaining the information is concluded at a step 50. If the desired information associated with the physical address is not found within the cache hierarchy at step 46, then the main memory 6 is searched for that information at a step 52. Once the information is found, then at a step 54 the cache hierarchy 12 is updated with that information and that information is additionally provided to the processor at step 48 before conclusion of the procedure at step 50.

The steps 44-54 are only meant to be generally representative of the procedure followed by the microprocessor system 2 as it accesses the caches of the cache hierarchy 12 and the main memory 6 upon obtaining the physical address of the desired information. In particular, where the cache hierarchy 12 includes more than one cache, it should be understood that, when a particular piece of information associated with a given physical address is missing from a lower-level cache, the next higher-level cache is then consulted with respect to the obtaining of that information. If the information is within that next level of cache, then the first cache is updated with that information, but if the information is still lacking within that next level of cache, then the next higher-level cache (if such exists) is then consulted. It is only when all of the caches have been searched that the processor 8 then proceeds to search the main memory 6 for the information corresponding to the particular physical address.

Returning to step 40, if a desired translation is not found within the TLB cache 24, then a TLB miss has occurred. Consequently, the processor 8 then searches the VHPT cache 30 for a VHPT entry containing the translation information between the particular virtual address and its corresponding physical address, at a step 56. If the desired VHPT entry is found at a step 58, then at a step 60 that VHPT entry is provided to the TLB cache 24 and the TLB cache is modified to include the translation information associated with that VHPT entry. Further, the process then returns to step 42, in which the processor 8 is provided with the physical address corresponding to the requested virtual address.

However, if the desired VHPT entry is not found at step 58, then at a step 62 the processor 8 searches the main memory 6, particularly the page table 26 of the main memory, for the desired VHPT entry (or corresponding page table information, which need not necessarily be hashed). At a step 64, the identified VHPT entry is then provided to the VHPT cache 30, which is then updated to include that entry. Further, the procedure then advances again to steps 60, 42 et seq., with the processor 8 then obtaining and utilizing the desired physical address information to obtain the desired information for use by the process being executed by the processor.

It is envisioned that the page table 26 has entries corresponding to every or virtually every single virtual address/physical address correspondence, such that step 64 will never (or almost never) fail to result in the provision of the desired translation information. However, in certain embodiments, it would be possible for additional steps to be taken if the desired VHPT entry information were not available and a further fault occurred. Also, with respect to steps 52 and 54, it should be understood that it is possible that a particular physical address or information associated therewith may not be available in a particular instance, in which case the procedure would experience a fault.

Numerous variations of the above-described embodiments are possible in accordance with other, alternate embodiments of the present invention. For example, although the VHPT cache 30 in the present embodiment is intended to be especially dedicated to storing one or more VHPT entries, in alternate embodiments, the VHPT cache 30 could be largely or substantially dedicated to storing VHPT entries but at the same time still store other types of information as well. So long as the benefits of temporal locality were provided by the VHPT cache 30 in large degree, the remainder of the VHPT cache could be used to store other data. For example, in one alternate embodiment, 90% of the VHPT cache would be used to store VHPT entries while the remaining 10% of the cache would be used to store other information.

Although the physical layout of the various caches of the cache hierarchy 12, TLB cache 24 and VHPT cache 30 could be largely as shown in FIG. 1, the physical arrangement of these caches could also take a variety of other forms. For example, in at least some embodiments, the VHPT cache could be positioned in front of the first cache 14 of the cache hierarchy 12 (e.g., between the cache 14 and the processor 8). The VHPT cache 30, to the extent that it is largely or entirely dedicated to the holding of VHPT entries, need not be coherent with the rest of the microprocessor system (e.g., no snooping would be necessary), particularly if purge instructions were used to invalidate the entire VHPT cache when changes were to be introduced to the cache (for example, if a ptc.g command was given in the case of the Itanium® processor mentioned above).

In embodiments such as that illustrated in FIG. 1, the overall communication links 22 used to link the processor 8 with the main memory 6 by way of the cache hierarchy 12 are different from the communication links 28 used to link the processor 8 with the main memory 6 by way of the VHPT cache 30 and the TLB cache 24. That is, the various caches within the microprocessor 4 are linked to one another and to the main memory in such a manner that there are two paths linking the processor 8 to the main memory 6, one involving the cache hierarchy 12 and the other involving the TLB cache 24 and the VHPT cache 30. However, in alternate embodiments, the layout and interconnection of the various caches of the cache hierarchy 12, TLB cache 24 and VHPT cache 30 in relation to one another and the processor 8 and main memory 6 could vary from that shown. Further, depending upon the embodiment, more than one VHPT cache 30 could also be employed (e.g., a hierarchy of VHPT caches could be employed).

Additionally, the present invention is intended to encompass a variety of modifications/refinements of the above-described embodiments that are tailored for particular microprocessors or tailored to meet other considerations. For example, the size of the VHPT cache, the size/number of the VHPT entries within that cache, the types of software commands that could be used to interact with the VHPT cache, the hash functions that are used, and other features could all be varied depending upon the type/needs of the microprocessor being used. Appropriate variations could be determined based upon manuals or other literature concerning the microprocessor of interest, for example, the Intel® Itanium® Architecture Software Developer's Manual concerning the Itanium® processor mentioned above. While as discussed above the VHPT provided by the VHPT cache can in some embodiments be configured and operated in much the same manners as conventional VHPTs are configured and operated (e.g., such as the VHPTs described within the Intel® Itanium® Architecture Software Developer's Manual), the present invention is also intended to encompass a variety of VHPTs configured and/or operated in a variety of manners other than those of conventional VHPTs.

It is specifically intended that the present invention not be limited to the embodiments and illustrations contained herein, but include modified forms of those embodiments including portions of the embodiments and combinations of elements of different embodiments as come within the scope of the following claims.

We claim:

1. A microprocessor system capable of supporting a virtual memory, the microprocessor system comprising:
    a first cache configured to store at least one of data and instructions for use by a process;
    a second cache serving as a translation lookaside buffer (TLB) that stores virtual address translations referenced by the process;
    a third cache storing a virtual hash page table (VHPT) that is configured to be accessed upon an occurrence of a TLB miss, wherein the third cache is substantially distinct from the virtual memory, wherein the third cache is substantially distinct from the virtual memory; and
    a processor on which the process is performed, wherein the processor is at least indirectly in communication with each of the caches.

2. The microprocessor system of claim 1, further comprising a main memory, wherein the third cache is in communication with the main memory.

3. The microprocessor system of claim 2, wherein the main memory stores page table information, and wherein the third cache is able to obtain VHPT entries for storage within the third cache from the page table information within the main memory.

4. The microprocessor system of claim 2, wherein the main memory includes a plurality of dynamic random access memory (DRAM) chips.

5. The microprocessor system of claim 2, wherein the main memory includes at least one storage device selected from the group consisting of a floppy disk, a hard disk and a magnetic tape.

6. The microprocessor system of claim 2, wherein the main memory is accessible by the first cache as well as by the third cache.

7. The microprocessor system of claim 6, wherein the first cache and the third cache respectively access the main memory by way of independent communication paths.

8. The microprocessor system of claim 1, further comprising a fourth cache, wherein the first and fourth caches are part of a cache hierarchy.

9. The microprocessor system of claim 8, wherein the cache hierarchy further includes a fifth cache, and wherein the first, fourth and fifth caches respectively include successively larger amounts of memory.

10. The microprocessor system of claim 1, wherein the third cache is dedicated to storing the VHPT.

11. The microprocessor system of claim 1, wherein the VHPT stored in the third cache includes a plurality of VHPT entries that are representative of correspondences between virtual addresses and physical addresses.

12. The microprocessor system of claim 1, wherein at least ninety percent of a total amount of memory within the third cache stores VHPT entries, and each of the virtual address translations includes a respective virtual address and a respective physical address, and wherein the virtual address is a 64-bit address.

13. The microprocessor system of claim 1, further comprising a page walker that searches the third cache for at least one VHPT entry in response to the occurrence of the TLB miss with respect to the second cache.

14. A method of operating a microprocessor system, the method comprising:
    providing a processor, a virtual memory, a first cache serving as a translation lookaside buffer (TLB), and a second cache storing a virtual hash page table (VHPT);
    determining that a process being executed by the processor is requesting a translation between a virtual address associated with the virtual memory and a physical address;
    searching for the translation within the first cache and determining that a TLB miss has occurred because the first cache lacks the translation;
    searching the second cache for a VHPT entry including information related to the translation; and,
    if the VHPT entry is found in the second cache, providing at least some of the information of the VHPT entry to at least one of the first cache and the processor, wherein the second cache is substantially distinct from the virtual memory.

15. The method of claim 14 wherein, if the VHPT entry is found in the second cache, the information is provided to the first cache so as to update the TLB and then further utilized to generate the translation, which is subsequently provided to the processor.

16. The method of claim 15, further comprising:
    determining the physical address based upon the translation; and
    accessing at least one of a cache hierarchy and an additional memory device based upon the physical address to obtain at least one of data and instructions for use by the process wherein the second cache is at least substantially dedicated to storing the VHPT.

17. The method of claim 14, further comprising, if the VHPT entry is not found in the second cache:
    accessing at least one of a third cache and a main memory device to obtain appropriate page table information relating to the VHPT entry;
    updating the second cache with the VHPT entry based upon the obtained page table information; and
    updating the first cache based upon the VHPT entry.

18. The method of claim 14, wherein the second cache is searched by way of at least one of a hardware page walker and a software page walker.

19. A microprocessor system with enhanced capability to respond to translation lookaside buffer (TLB) misses, the microprocessor system comprising:
    first means for storing that serves as a TLB;

second means for storing virtual hash page table (VHPT) information, wherein the second means for storing is substantially distinct from a virtual memory;

third means for storing that is configured to store page table information wherein the second means for storing is consulted prior to the third means for storing when a TLB miss occurs.

20. The microprocessor system of claim 19, further comprising a means for processing, wherein the means for processing consults the first means for storing in order to obtain a translation of a virtual address, and wherein the second means for storing is consulted when the TLB miss occurs with respect to the first means for storing, wherein the second means for storing is substantially dedicated to storing the VHPT information.

* * * * *

UNITED STATES PATENT AND TRADEMARK OFFICE
CERTIFICATE OF CORRECTION

PATENT NO. : 7,409,524 B2  
APPLICATION NO. : 11/205622  
DATED : August 5, 2008  
INVENTOR(S) : Kevin Safford et al.

Page 1 of 1

It is certified that error appears in the above-identified patent and that said Letters Patent is hereby corrected as shown below:

In column 9, lines 37-38, in Claim 1, after "TLB miss," delete "wherein the third cache is substantially distinct from the virtual memory,".

In column 10, lines 23-24, in Claim 14, delete "Serving" and insert -- serving --, therefor.

In column 10, line 51, in Claim 16, after "process" insert -- , --.

In column 11, line 3, in Claim 19, after "memory;" insert -- and --.

Signed and Sealed this

Second Day of December, 2008

JON W. DUDAS  
*Director of the United States Patent and Trademark Office*